United States Patent [19]

Chatterton

[11] Patent Number: 5,513,595
[45] Date of Patent: May 7, 1996

[54] TRANSPORTABLE ANIMAL ENCLOSURES

[75] Inventor: John Chatterton, Chambers Flat, Australia

[73] Assignee: J. R. Floats Pty. Ltd., Beenleigh, Australia

[21] Appl. No.: 256,434
[22] PCT Filed: Jan. 7, 1993
[86] PCT No.: PCT/AU93/00008
§ 371 Date: Oct. 13, 1994
§ 102(e) Date: Oct. 13, 1994
[87] PCT Pub. No.: WO93/13959
PCT Pub. Date: Jul. 22, 1993

[30] Foreign Application Priority Data

Jan. 7, 1992 [AU] Australia .................. PL0302

[51] Int. Cl.⁶ .................. B60B 3/04; B61D 3/00
[52] U.S. Cl. .................. 119/412; 296/24.2
[58] Field of Search .................. 119/7, 11, 15, 119/20, 19; 296/24.2

[56] References Cited

U.S. PATENT DOCUMENTS

| | | | |
|---|---|---|---|
| 2,630,097 | 3/1953 | Johansen | 119/20 X |
| 3,053,224 | 9/1962 | Pierce | 119/7 |
| 3,862,526 | 1/1975 | Loughlin | 52/70 |
| 4,168,933 | 9/1979 | Kane | 119/11 X |
| 4,195,593 | 4/1980 | Dunn | 119/19 |
| 4,355,594 | 10/1980 | Wagner | 119/7 |
| 4,468,061 | 8/1984 | Blake | 119/7 X |
| 4,530,538 | 7/1985 | Greene, Jr. | 119/7 X |
| 4,732,419 | 3/1988 | Ketterer | 119/7 X |

*Primary Examiner*—Thomas Price
*Attorney, Agent, or Firm*—Amster, Rothstein & Ebenstein

[57] ABSTRACT

A transportable animal enclosure assembly including opposed longitudinal sidewall assemblies each having a respective upper portion adapted to constrain sideways movement of the upper body portion of an animal being transported and a base wall extending between and laterally beyond the upper portions and being accessible to the animal transported. One or both sidewall assemblies preferably include a lower portion that slopes inwardly from the base wall to the upper portion. The transportable animal enclosure preferably includes adjustable rear support for supporting the rump of the animal and an adjustable chest restrainer for restraining the animal against the rear support.

14 Claims, 6 Drawing Sheets

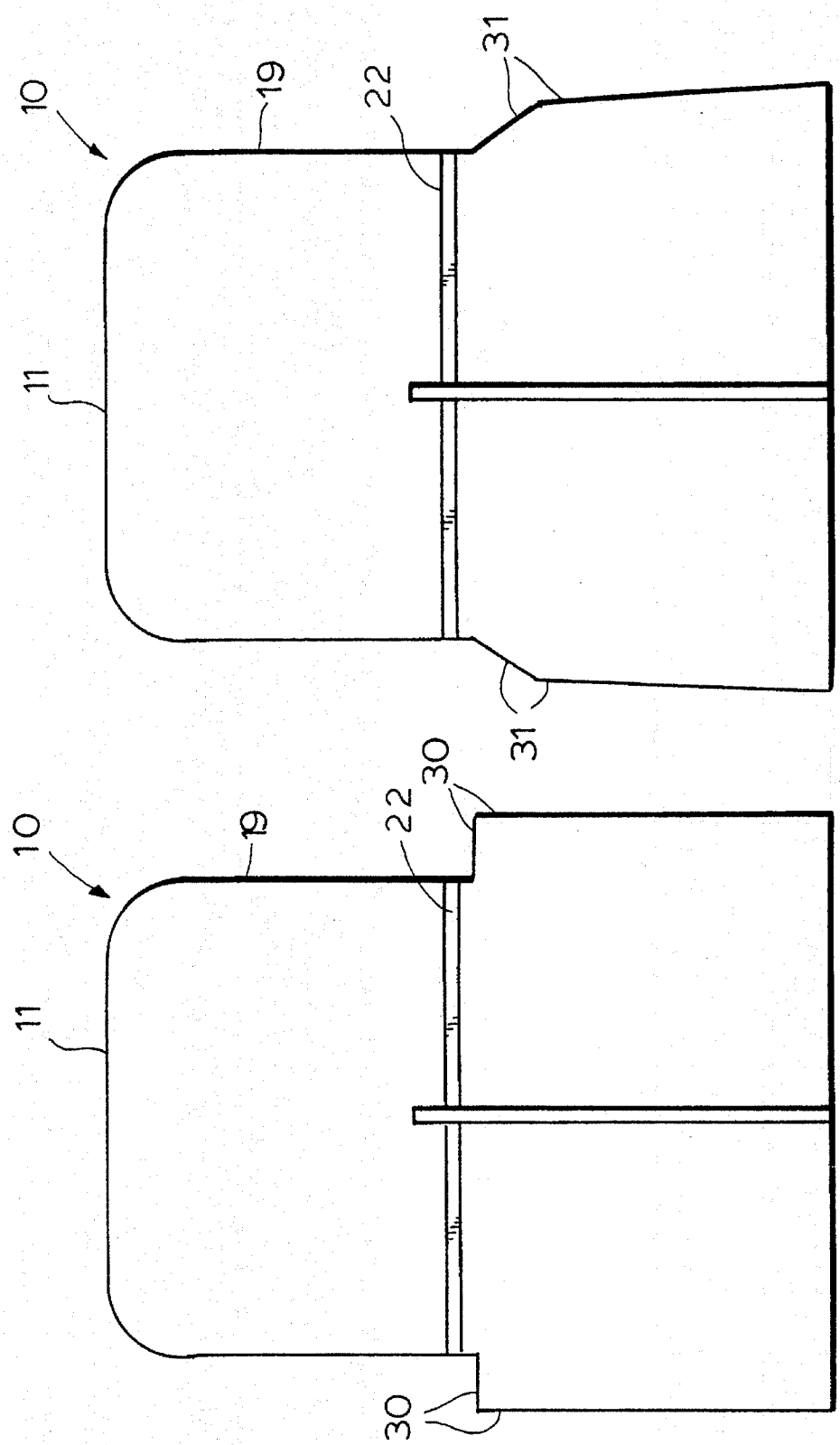

TRANSPORTABLE ANIMAL ENCLOSURES

This invention relates to transportable animal enclosures.

This invention has particular but not exclusive application to improvements to animal enclosures for horses, such enclosures being in the form of trailers and the like towed by a vehicle and for illustrative purposes reference will be made to such application. However, it is to be understood that this invention could be used in other applications, such as for other animal transportation such as trucks and/or semi-trailers, rail mounted carriages, aircraft or shipping containers and such like or for non-equine animals and such like.

Transportable animal enclosures, including horse floats, generally comprise a space to accommodate an animal and include transportation means which may be either formed integrally with, or connectable to, the accommodation space. The animal accommodation space is usually made to conform to the larger or basic dimensions of the animal with an additional surrounding space to allow for comfort and ease of use for the animal. In horse floats the accommodation space is normally in the form of a box having a rounded top and/or front end, a gate pivoted about its bottom edge as a back wall. The accommodation space further includes substantially vertical sides spaced apart slightly greater than the body width or thickness of a horse. The gate is usually pivotable from a closed position where it forms the back wall of the accommodation means to an open position where it forms a ramp permitting an animal to conveniently enter and exit the animal enclosure.

Whilst such enclosures are generally satisfactory, an animal may be injured during transit due to direction changes. When cornering, for example, the animal may attempt to climb the side walls and may stumble and fall to the floor. Intuitively, some animals have a tendency to crouch down on their hind legs, which in combination with wall climbing may cause scramble and/or fall injuries to the animal.

It will be appreciated that this invention is not limited to jument, sumpter-beasts or other beasts of burden, and may be applied to the transport of other animals which are prone to the abovementioned difficulties, such as zoo animals, farm animals and such like.

The present invention aims to alleviate one or more of the above disadvantages and to provide a transportable animal enclosure which will be reliable and efficient in use.

With the foregoing in view, this invention in one aspect resides broadly in a transportable animal enclosure assembly including:

opposed longitudinal side wall assemblies each having a respective upper portion adapted to constrain sideways movement of an upper body portion of an animal being transported, and a base wall assembly extending between and laterally beyond said upper portions and being accessible to the animal being transported. Suitably the lower portion is adapted to accommodate splayed legs of the animal being transported.

The side wall assemblies may be open at the lower portion to permit the animal to access the base wall lying laterally beyond the upper portions. In particular, the side wall assemblies are arranged so that the feet and/or the legs of the animal may splay outwardly. Preferably, one or both side wall assemblies include a lower portion disposed outwardly from the respective said upper portion and extending towards said base wall. In a further preferred form, the lower portion slopes inwardly from the base wall to the upper portion.

Preferably, the transportable animal enclosure includes rear support means for supporting the rump of an animal and chest restraining means for restraining the animal against the rear support means. The chest restraining means and/or rear support means may be fixed for an animal of a particular size. Preferably, however, the chest restraining means and/or the rear support means are adjustable to encourage animal to substantially support itself upon said rear support means. In a preferred embodiment, the rear support means is in the form of a height adjustable bar and the chest restraining means is in the form of a chest bar adjustable towards or away from the height adjustable bar. Suitably, the chest bar is movable longitudinally with respect to the length of the transportable animal enclosure.

In a preferred embodiment, the rear support means is a suitably padded or protective bar displaced forwardly of the rear wall of the transportable animal enclosure and adapted to support the rear portion of the animal should the animal attempt crouch, sit or squat down whilst occupying the transportable animal enclosure. Preferably, the chest restraining means is co-operable with the rear support means whereby, in use, an animal is limited in its forward and backward motion within the transportable animal enclosure, the chest restraining means and the rear support means each being respectively adjustable to accommodate a range animal sizes.

The transportable animal enclosure preferably includes a top wall extending across the side wall assemblies, a front wall extending upwardly from the base wall and between the side wall assemblies, and a hinged rear wall pivotable about a lower edge from a closed attitude where the hinged rear wall encloses the transportable animal enclosure and an open attitude where the hinged rear wall opens to form an opening and an access ramp which tapers away from the animal enclosure. Suitably, the hinged rear wall is in the form of a symmetrical trapezium having its longer side as the hinged side.

In a preferred embodiment of the invention, the opposed longitudinal side wall assemblies are spaced apart to accommodate two animals for transport. Suitably, partition means is included between the side wall assemblies for separating each animal and/or constraining sideways movement of the upper body portion of the or each animal being transported. The partition means may be in the form of dividing wall having an upper portion in like manner to the upper potion of the side wall assemblies and being open below the upper portion to permit access to the base wall of the adjacent animal enclosure formed by the partition means.

Preferably, however, the partition means is a dividing bar separating the transportable enclosure into two accommodation bays, with the dividing bar being arranged at a height appropriate to restrain the sideways movement of an animal in any one or more of the bays. Additionally, the partition means may be releasable at its rear and hinged about a vertical axis at its forward part for convenience of use with animals accommodated in one or both bays as is typically provided in horse floats.

In another aspect this invention resides broadly in a method of enclosing an animal for transport, said method including:

providing an animal enclosure as herein described;

placing an animal in the animal enclosure;

adjusting the rear support means to suit the rear of the animal, and adjusting the chest restraining means to suit the chest of the animal.

The transportable animal enclosure is preferably in the form of a vehicle whereby the enclosure is mounted on carriage means. The carriage means my be integral with the transportable animal enclosure to form a drivable vehicle such as a motor lorry, rail motor, marine vessel, aircraft or such like, but preferably, the carriage means is a vehicle trailer which is detachably connectable to another drivable vehicle. When formed as a vehicle trailer such as a horse float, the transportable animal enclosure may be pushed or towed by a vehicle or such like and any means of causing motion may be employed to transport the transportable animal enclosure as desired.

In order that this invention may be more readily understood and put into practical effect, reference will now be made to the accompanying drawings which illustrate a preferred embodiment of the invention, wherein:

FIG. 4 is a diagrammatic rear end view of a transportable animal enclosure according to another preferred embodiment of this invention;

FIG. 5 is a diagrammatic rear end view of a transportable animal enclosure according to a further preferred embodiment of this invention;

Figure 1:
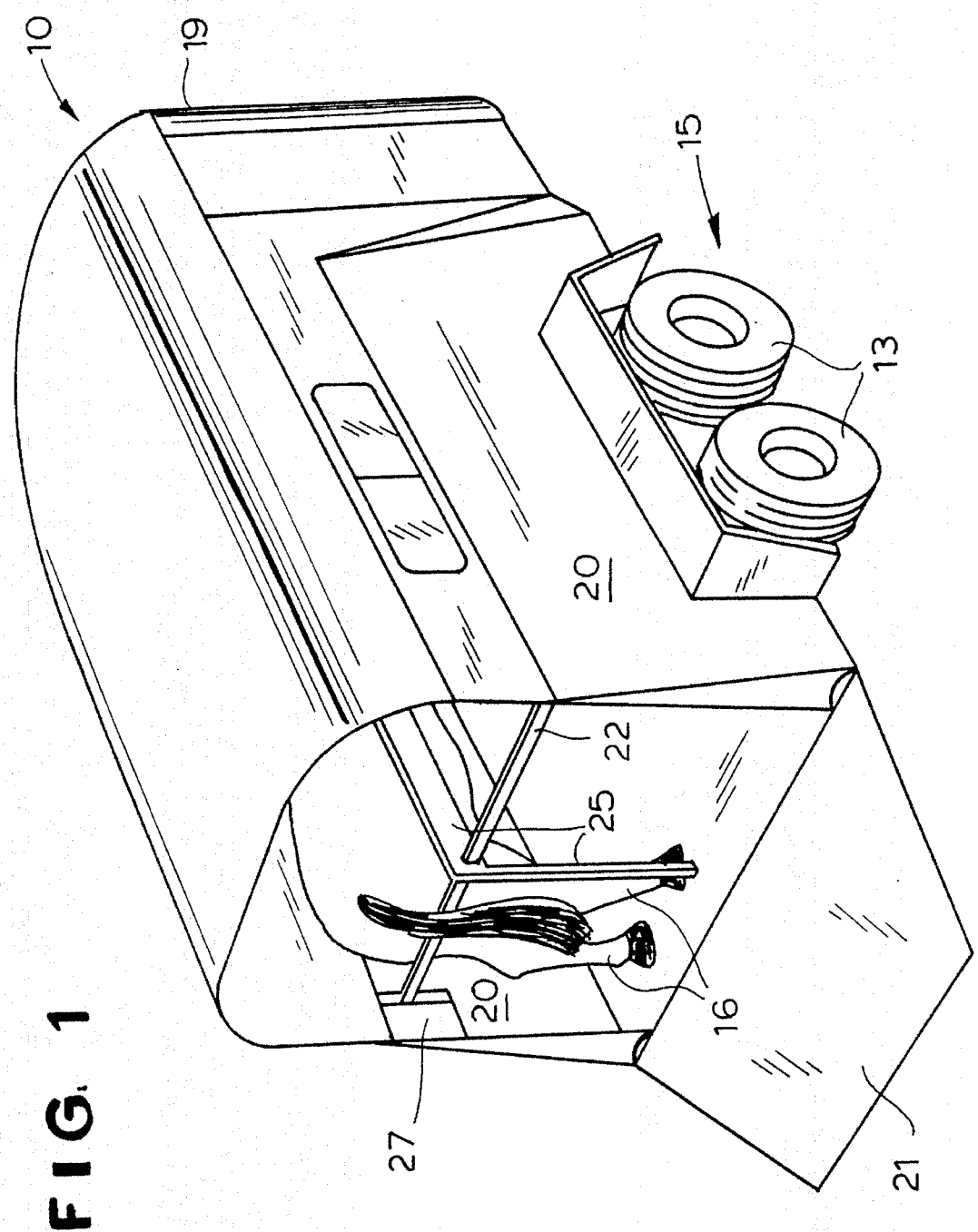
FIG. 1 is a diagrammatic view of the rear and side of a transportable animal enclosure.
Figure 2:
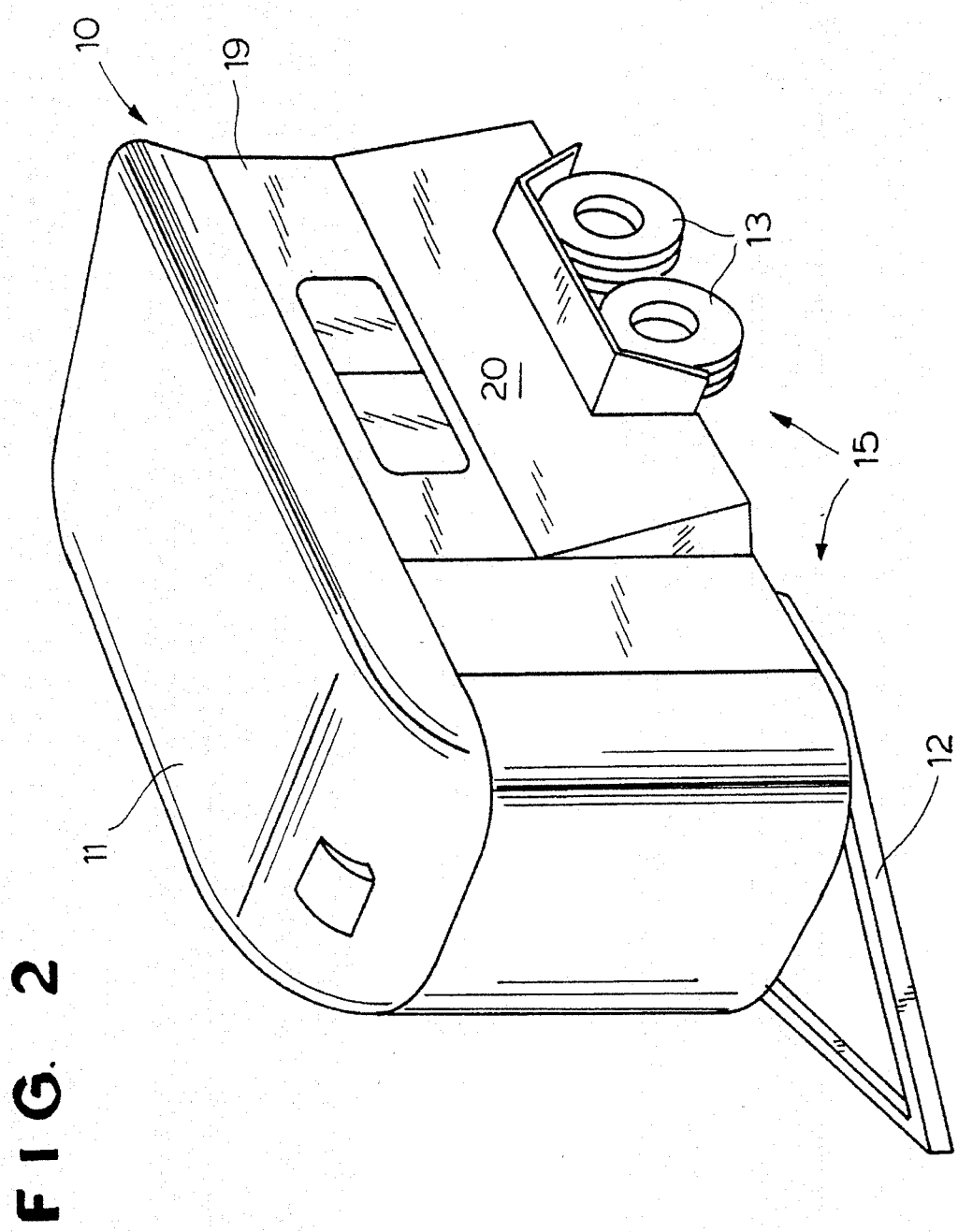
FIG. 2 is a diagrammatic view of the front and side of the transportable animal enclosure of FIG. 1.
Figure 3:
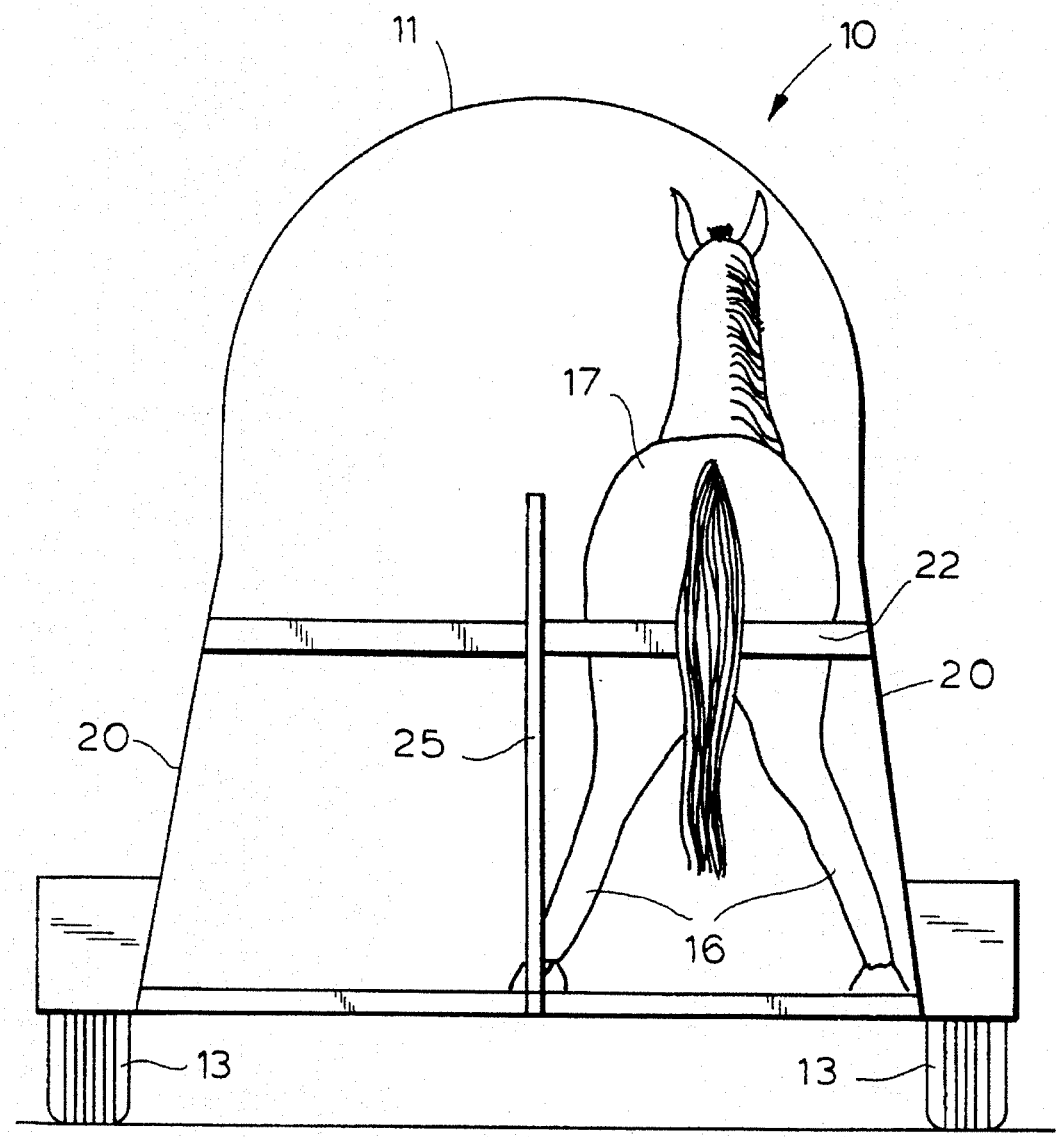
FIG. 3 is a diagrammatic rear end view of the transportable animal enclosure of FIG. 1.

Referring to FIGS. 1 to 3, a transportable animal enclosure in the form of a horse float 10 has an enclosure 11 mounted upon a carriage means in the form of chassis 15 having a draw bar 12 and a plurality of wheels 13. The enclosure 11 includes a pair of opposed longitudinal side walls each having an upper wall portion 19 and a lower portion or an extension portion 20 to accommodate the spread legs 16 of an animal 17 should the animal require the extra stability afforded by spreading its legs. The horse float 10 shown also includes a tail gate 21 shown in FIG. 1 in the open position. The tail gate 21 is omitted from FIG. 3 to provide a clear view of the horse float 10.

A bar support 22 is also provided to discourage the animal 17 from squatting, crouching or kneeling in the horse float 10. The bar extends between the sides of the enclosure 11 which also has a divider 25 to divide the space with the enclosure 11 into two bays.

Figure 6:
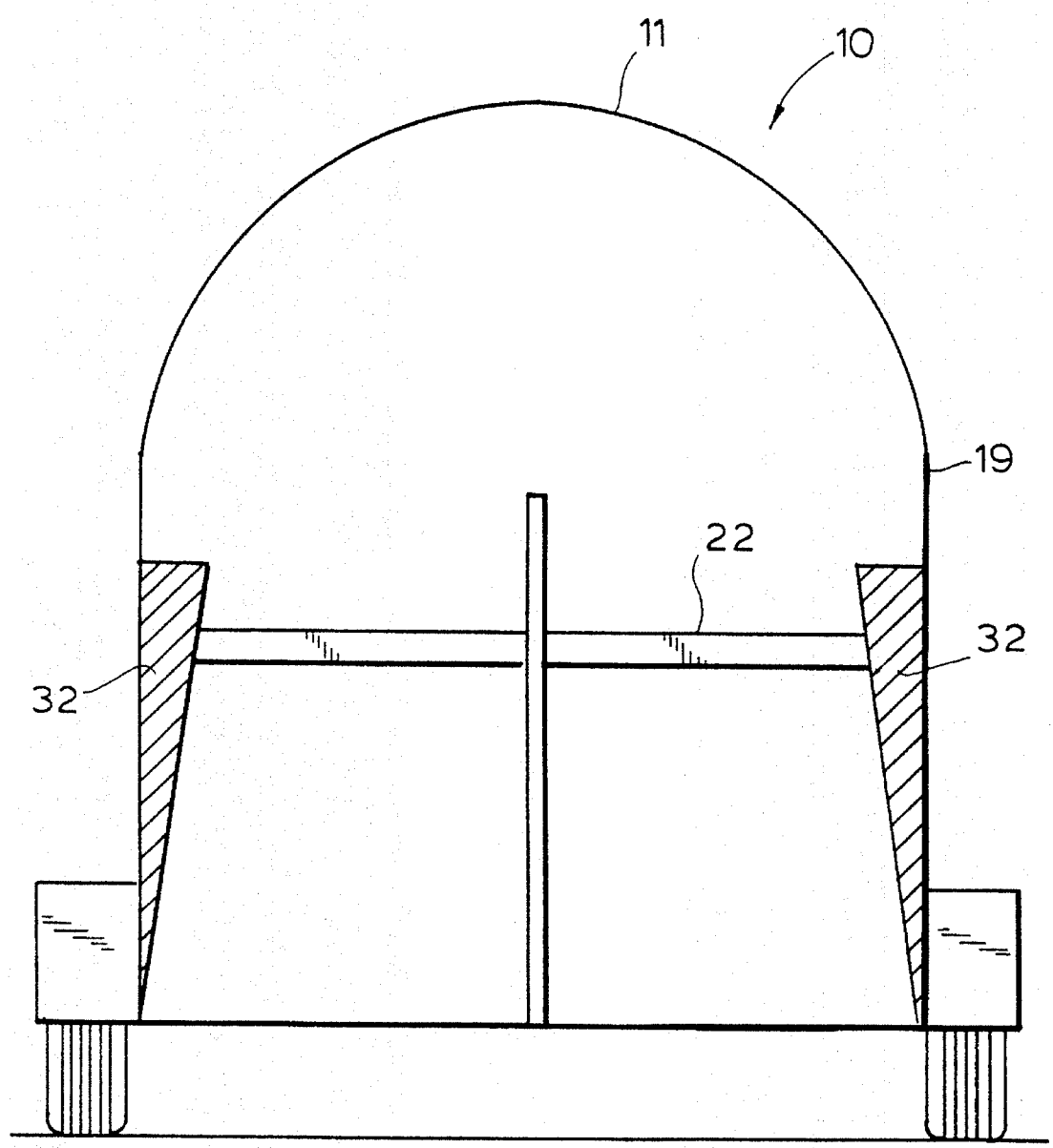
FIG. 6 is a diagrammatic rear end view of a transportable animal enclosure according to a still further preferred embodiment of this invention.

Referring to FIGS. 4 and 5, alternative shapes of the extension of the enclosure 11 may be used, such as a square shoulder shape 30 or an oblique shoulder shape 31 as shown. Referring to FIG. 6 the extension of the enclosure 11 may be formed by a hip insert 32 on each side to give a smooth outer face as shown.

Figure 7:
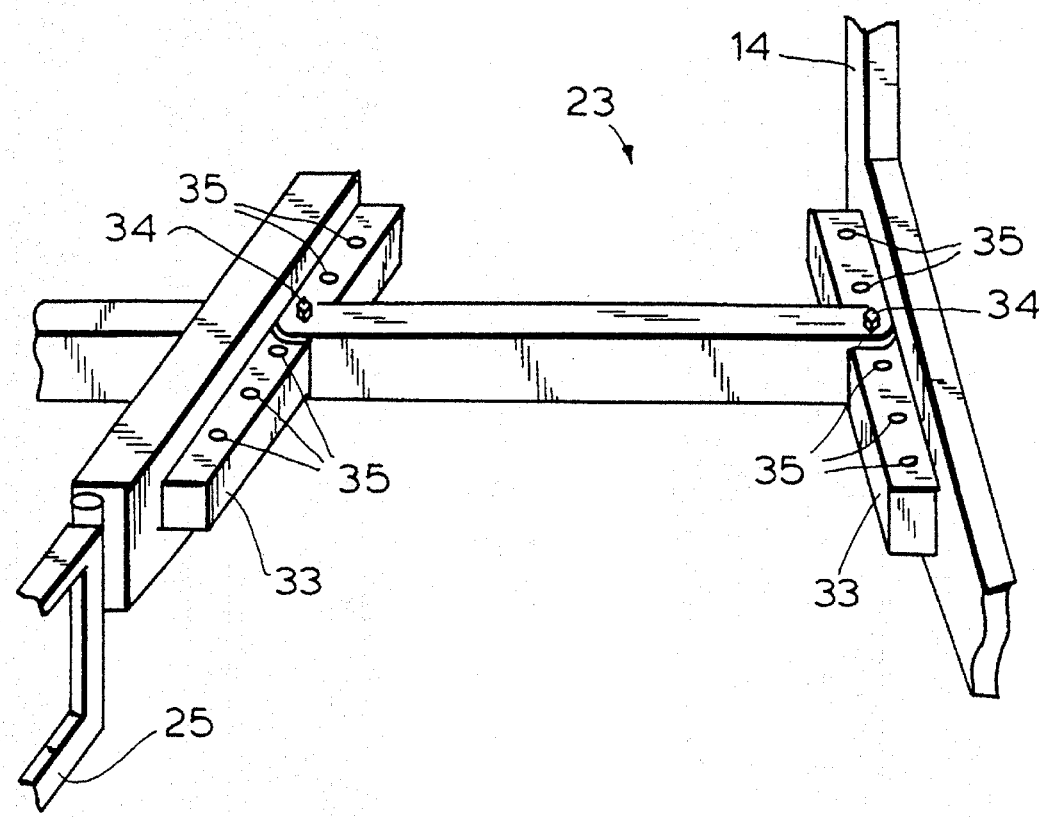
FIG. 7 is a diagrammatic view of a chest restraining bar for the transportable animal enclosure of any of the previous drawings.

Referring to FIG. 7, a chest restraint 23 is provided within the horse float 10. The chest restraint 23 is fixed to a chassis frame 14 and the divider 25 by a pair of chest restraint brackets 33. The chest restraint 23 is operatively connected to a selected position on the chest restraint brackets 33 by inserting a chest restraint end fastening 34 through apertures in the respective ends of the chest restraint 23 and selected respective bracket apertures 35 in the chest restraint bracket 33. In the embodiment shown, there are six bracket apertures 35 provided in each chest restraint bracket 33.

Figure 8:
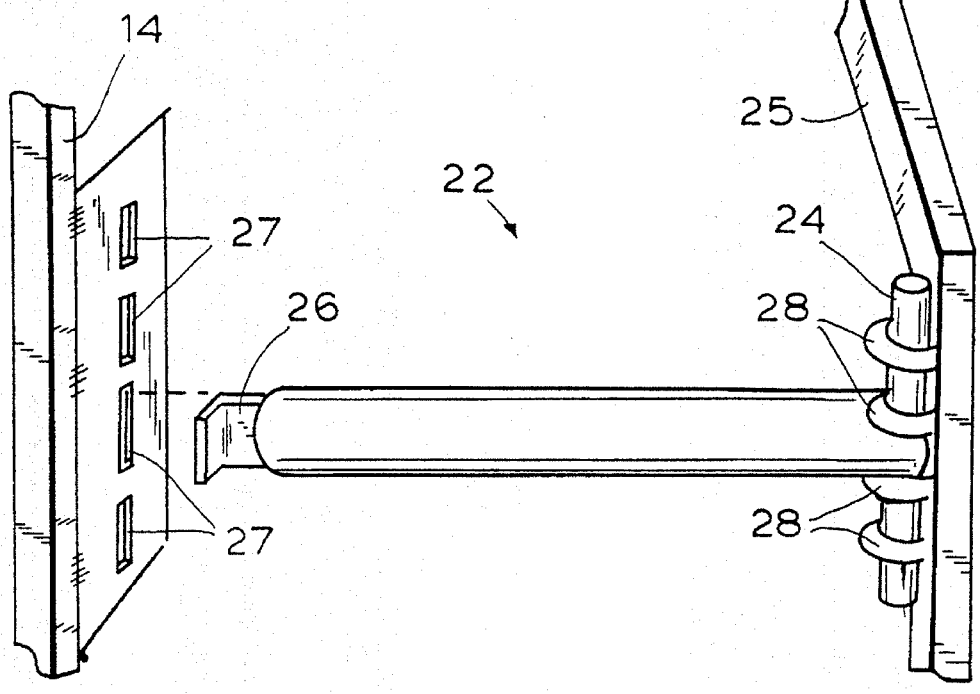
FIG. 8 is a diagrammatic view of a rear supporting bar for the transportable animal enclosure of any of the previous drawings.

Referring to FIG. 8, the bar support 22 is supported the rear of an accommodation bay in the horse float 10 and extending between the divider 25 and the chassis frame 14. An alignment tag 26 is provided for insertion into a selected one of a plurality of bar support apertures prior to inserting a bar support pin fastening 24 through the apertures created by a plurality of bar support loops 28 and an aperture in the end of the bar support 22.

Whilst not limiting the scope of this invention to any particular form of construction, a typical horse float 10 may be constructed by first providing a chassis 15 including the wheels and the draw bar 12. The chassis frame 14 is erected on the chassis 15 and a skin of sheet material such as metal or fiberglass is fixed thereto to provide the side walls, front wall and roof. Typically, windows are provided on each side wall above the extension portion 20 and a door on one or both sides of the side walls, forward of the extension portion 20, are also provided.

Additionally, the front wall of the horse float 10 is typically semi-circular and includes a window. Suitably, braking mechanisms, a jockey wheel for supporting draw bar when not connected to a towing vehicle, signal lighting and the like are installed in and/or on the horse float as desired.

Typically, the floor of the horse float and the upper/internal surface of the tailgate 21 are coated with an appropriate surface coating and the design of the horse float is such that it may be easily cleaned such as by a water pressure hose or the like.

Typically, a space is provided forward of the chest restraint 23 for transport of other goods as desired such as feed and/or water for the horses being transported.

In use, a horse float of this invention may be used to transport one or more horses, although a typical embodiment would be a towed vehicle for floating two horses.

With the tail-gate in an open position, one or two horses may be led into respective accommodation bays in the horse float and the rear support bar put into position at an appropriate height for each horse. Then, the chest restraint bar is placed into the appropriate position to encourage each horse to use the rear support bar as a seat when required. For transport of the horses, the tail-gate 21 is closed to provide a back wall for the horse float 10.

During transportation of the animal or animals in the transportable animal enclosure of this invention, when a sideways force component is placed on the animal due to the movement of the enclosure, a typical reaction of the animal is to crouch so as to lower its centre of gravity. When attempting to crouch, the rump of the animal is supported by the rear support bar and the animal cannot move forward therefrom because of the chest restraint bar restricting the forward movement of the animal.

Moreover, a tendency of the animal to kick its rear legs outwardly or scramble in an attempt to regain its balance may occur and the extension space provided by the invention prevents the animal from injuring itself. Where two or more animals are accommodated in side by side relationship, the extension space is provided by a portion of the adjacent accommodation bay.

When de-floating the horses, they frequently attempt to turn whilst walking backwards out of the accommodation bay and it is believed that by providing the tail-gate with a wider hinged edge tapered towards the distal edge, the horse is less likely to step off the ramp at least until the horse is relatively close to ground.

It will of course be realised that while the above has been given by way of illustrative example of this invention, all such and other modifications and variations thereto as would be apparent to persons skilled in the art are deemed to fall within the broad scope and ambit of this invention as is claimed in the following claims.

I claim:

1. A transportable animal enclosure including:

substantially opposed side wall assemblies, each comprising respective upper wall portions restraining sideways movement of an animal and respective lower wall portions diverging from said upper wall portions; and a base wall forming a floor for supporting an animal and connecting said lower wall portions.

2. A transportable animal enclosure as claimed in claim 1, wherein said lower portions slope inwardly from said base wall to said upper portions.

3. A transportable animal enclosure as claimed in claim 1, and including a top wall extending across said side wall assemblies, a front wall extending upwardly from the base wall and between said side wall assemblies, and a hinged rear wall pivotable about a lower edge of the base wall from a closed attitude where said hinged rear wall enclose the transportable animal enclosure and an open attitude where said hinged rear wall opens to form an opening and an access ramp which tapers away from said animal enclosure.

4. A transportable animal enclosure as claimed in claim 1, including attached to said side wall assemblies rear support means for the rump of an animal.

5. A transportable animal enclosure as claimed in claim 4, including chest restraining means secured to said enclosure for restraining the animal against said rear support means.

6. A transportable animal enclosure as claimed in claim 5, wherein said chest restraining means and/or said rear support means are adjustable to encourage an animal to substantially support itself upon said rear support means.

7. A transportable animal enclosure as claimed in claim 5, wherein said rear support means is in the form of a height adjustable bar and said chest restraining means is in the form of a chest bar adjustable towards or away from said height adjustable bar.

8. A transportable animal enclosure including:

substantially opposed side walls spaced apart to accommodate two or more animals for transport, said side wall comprising respective upper wall portions restraining sideways movement of an animal and respective lower wall portions diverging from said upper wall portions; and a base wall forming a floor for supporting the animals and connecting between said lower wall portions.

9. A transportable animal enclosure as claimed in claim 8, including partition means for separating each animal and/or constraining sideways movement of each animal being transported, said partition means being secured to said enclosure substantially between said upper wall portions, but not extending therebelow.

10. A transportable animal enclosure as claimed in claim 8, including attached to said wall assemblies rear support means for the rump of an animal.

11. A transportable animal enclosure as claimed in claim 10, including chest restraining means for restraining the animal against said rear support means secured to said enclosure.

12. A transportable animal enclosure as claimed in claim 11, wherein said chest restraining means and/or said rear support means are adjustable to encourage an animal to substantially support itself upon said rear support means.

13. A transportable animal enclosure as claimed in claim 12, wherein said rear support means is in the form of a height adjustable bar and said chest restraining means is in the form of a chest bar adjustable towards or any from said height adjustable bar.

14. A transportable animal enclosure as claimed in claim 8, wherein the animal enclosure is mounted on a wheeled carriage means for transporting said enclosure.

* * * * *